United States Patent
Lelarge et al.

(10) Patent No.: US 9,061,475 B2
(45) Date of Patent: Jun. 23, 2015

(54) PLANT FOR MANUFACTURING A RIGID PIPE FOR DRAWING UP DEEP WATER

(75) Inventors: Virginie Lelarge, Larmor Plage (FR); Daniel Bathany, Plougastel Daoulas (FR); Raymond Begoc, Plouzane (FR)

(73) Assignee: DCNS, Paris (FR)

( * ) Notice: Subject to any disclaimer, the term of this patent is extended or adjusted under 35 U.S.C. 154(b) by 338 days.

(21) Appl. No.: 13/638,319

(22) PCT Filed: Mar. 28, 2011

(86) PCT No.: PCT/FR2011/050669
§ 371 (c)(1),
(2), (4) Date: Jan. 10, 2013

(87) PCT Pub. No.: WO2011/121217
PCT Pub. Date: Oct. 6, 2011

(65) Prior Publication Data
US 2013/0098559 A1    Apr. 25, 2013

(30) Foreign Application Priority Data

Mar. 30, 2010 (FR) ..................... 10 52313

(51) Int. Cl.
| B29D 23/00 | (2006.01) |
| B29C 53/74 | (2006.01) |
| B63B 35/44 | (2006.01) |
| F16L 1/15 | (2006.01) |
| F16L 9/16 | (2006.01) |
| B29K 105/06 | (2006.01) |

(52) U.S. Cl.
CPC .............. *B29D 23/001* (2013.01); *B29C 53/74* (2013.01); *B29K 2105/06* (2013.01); *B63B 35/44* (2013.01); *F16L 1/15* (2013.01); *F16L 9/16* (2013.01); *Y02E 10/34* (2013.01)

(58) Field of Classification Search
CPC .............................. B29C 53/74; B29D 23/001
USPC .................................... 156/195, 425
See application file for complete search history.

(56) References Cited

U.S. PATENT DOCUMENTS

| 3,464,879 | A | * | 9/1969 | Poulsen | 156/425 |
| 3,520,749 | A | * | 7/1970 | Rubenstein | 156/173 |
| 3,548,724 | A | * | 12/1970 | Hall | 493/292 |
| 3,655,489 | A | * | 4/1972 | Poulsen | 156/429 |
| 3,886,338 | A | * | 5/1975 | Lokun et al. | 200/61.13 |
| 3,914,151 | A | * | 10/1975 | Poulsen | 156/425 |

(Continued)

FOREIGN PATENT DOCUMENTS

| DE | 1263279 B | * | 3/1968 |
| EP | 0 048 074 | | 3/1982 |

(Continued)

*Primary Examiner* — Jeff Aftergut
(74) *Attorney, Agent, or Firm* — Davidson, Davidson & Kappel, LLC

(57) ABSTRACT

This plant for manufacturing a rigid pipe for drawing up deep water for a marine thermal energy plant is characterized in that it comprises a floating platform on which there is installed a continuous production device in the vertical axis of the pipe, including a first stage of winding webs of fibers impregnated with resin about a winding roll for the partial crosslinking thereof, said wall being formed by modular elements in the form of plates, which are connected together so as to form a strip that moves in a spiral and repeating in the upper part of the roll so as to form a winding surface for the webs.

7 Claims, 2 Drawing Sheets

(56) References Cited

U.S. PATENT DOCUMENTS

| | | | |
|---|---|---|---|
| 3,979,250 A | | 9/1976 | Drostholm |
| 4,003,173 A | * | 1/1977 | Foley et al. .................. 52/309.17 |
| 4,097,568 A | * | 6/1978 | Foley et al. .................... 264/216 |
| 4,110,149 A | * | 8/1978 | Poulsen ........................ 156/429 |
| 4,147,454 A | * | 4/1979 | Willums ........................ 156/430 |
| 4,200,605 A | * | 4/1980 | Imamura et al. .............. 264/145 |
| 4,212,329 A | | 7/1980 | Horton |
| 2009/0309248 A1 | * | 12/2009 | Miller et al. .................. 264/40.4 |
| 2009/0309271 A1 | * | 12/2009 | Miller et al. .................... 264/563 |
| 2011/0272864 A1 | * | 11/2011 | Miller et al. .................... 264/557 |

FOREIGN PATENT DOCUMENTS

| | | |
|---|---|---|
| FR | 2 103 439 | 4/1972 |
| GB | 2 458 109 | 9/2009 |

* cited by examiner

PLANT FOR MANUFACTURING A RIGID PIPE FOR DRAWING UP DEEP WATER

The present invention relates to a plant for manufacturing a rigid pipe for drawing up deep water for an offshore electricity-producing plant. This pipe is used for offshore electricity production from ocean thermal energy.

BACKGROUND

An energy production facility of this type generally includes a platform on which means are placed for producing electricity from the temperature difference in the surface and deep water, said platform also being associated with means forming a pipe for drawing cold water up from a depth.

The operating principle of such an OTE (Ocean Thermal Energy) facility consists of using the temperature difference that exists naturally between the surface and deep water to run a thermal machine.

Due to the laws of thermodynamics, to have an acceptable efficiency, the implementation of such an OTE facility is only justified with a temperature difference for example greater than 20° C.

Typically, the water can for example be at a temperature of 25° C. on the surface and a temperature of 5° C. at 1000 meters deep.

One can then see that this limits the use of such facilities to specific areas, for example such as tropical areas.

The water must then be pumped at a very significant depth through means forming a suction pipeline associated with the platform, while the hot water is pumped on the surface.

Various attempts to develop OTE-based energy production facilities have already been made.

Efforts were for example made by Georges CLAUDE in the 1930s.

Of course, other operators have made attempts since then.

However, the very large majority of these attempts have failed due to various problems, and in particular problems of the mechanical strength of certain elements of those facilities with the environmental conditions encountered.

It is in fact known that in the geographical areas in which these facilities can be installed, particular meteorological conditions may be encountered such as relatively strong ocean currents, storms, etc., which causes the deterioration or even breakage of certain parts of the facility.

Other problems appear during the manufacture of the rigid pipe for drawing up deep water.

SUMMARY OF THE INVENTION

It has in fact already been proposed to produce that pipe in the form of sections jointed together using connecting means.

This nevertheless has a certain number of drawbacks, in particular in terms of the complexity and cost of such a structure.

Other solutions have consisted of producing the pipe on land and towing it to the exploitation site.

The handling operations for such a pipe, which can be several tens or even hundreds of meters long, are also extremely tedious.

It is also known that it has been proposed to use a continuous pipe manufacturing technique implementing the so-called "DROSTHOLM" roll technique as described in document FR-A-2 103 439, which is related to U.S. Pat. No. 3,979,250. Such a roll essentially comprises an endless hoop support strip advancing in a spiral to form a cylindrical surface for depositing filamentary winding webs and which rises in the lower portion through the inside of the roll to be renewed in the upper portion thereof.

However, this strip structure is not suitable for the manufacture of pipes having the dimensions, and in particular the diameters, considered in this application.

It is an object of the present invention to resolve these problems.

The present invention provides a plant for manufacturing a rigid pipe for drawing up deep water for a marine thermal energy facility, characterized in that it includes a floating platform on which continuous production means are installed in the vertical axis of the pipe, and comprising a first stage of winding webs of fibers impregnated with resin around a winding roll for the partial crosslinking thereof, formed by modular elements in the form of plates, which are connected together so as to form a strip that moves in a spiral and repeating in the upper portion of the roll so as to form a winding surface for the webs.

According to other aspects of the invention, the plant for manufacturing a rigid pipe for drawing up water includes one or more of the following features:
    each modular element assumes the form of a plate,
    the plant also comprises:
    a second stage of complete crosslinking of the resin,
    a third stage of mounting functional members on the pipe,
    a fourth stage of inspecting the pipe thus manufactured, and
    a fifth stage of guiding the pipe.
    the pipe includes a helical outer rib suitable for cooperating with guiding means of the fifth stage of guiding and driving the lowering to drive the lowering of the pipe into the water,
    means for protecting the manufactured pipe from solar radiation are provided between the platform and the water,
    the protection means comprise a canvas sheet, and
    the second stage of complete crosslinking of the resin includes means for heating the pipe.

BRIEF DESCRIPTION OF THE DRAWINGS

The invention will be better understood in light of the following description, provided solely as an example and done in reference to the appended drawings, in which.

DETAILED DESCRIPTION

Figure 1:
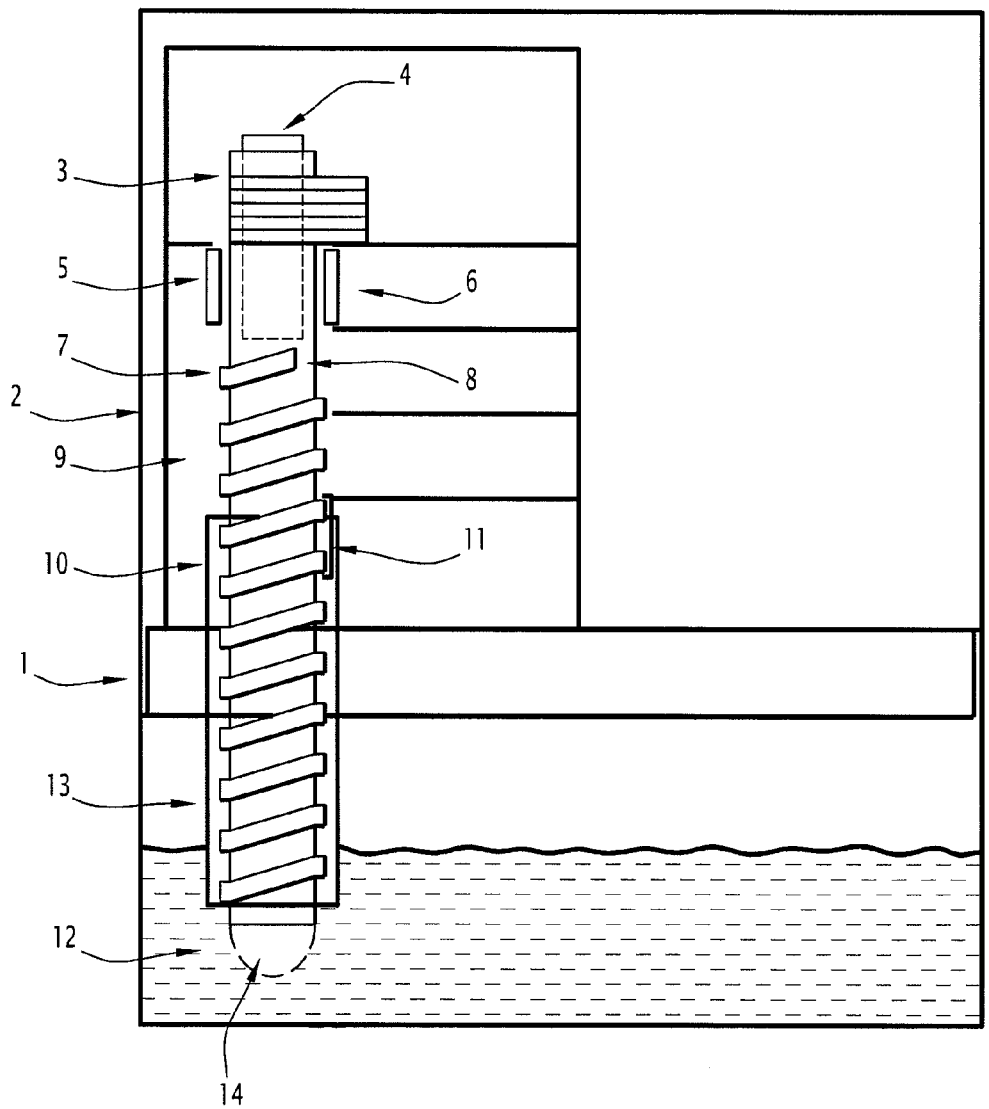
FIG. 1 shows a block diagram illustrating the structure and operation of a manufacturing plant according to the invention.

FIG. 1 shows part of a plant for manufacturing a rigid pipe for drawing up deep water that is designed to be implemented in a marine thermal energy plant.

This plant for manufacturing the rigid pipe includes a floating platform designated by general reference 1, on which continuous production means of the suction pipe are installed, said means then making it possible to produce, vertically and continuously, a pipe made from a composite fiber-resin material with a large diameter, for example comprised between 4 and 12 meters, by filamentary winding.

These manufacturing means are designated by general reference 2 in this figure and include a certain number of stages, including a first stage of winding the fibers and pre-curing the impregnating resin, designated by general reference 3.

This stage then includes various filamentary winding heads around a roll designated by general reference 4 in this figure, for example implementing the "DROSTHOLM" roll technique consisting of a cylindrical surface for receiving the filamentary winding web, advancing axially in a spiral to drive those webs and thereby forming the wall of the pipe, that surface rising through the inside of the roll to renew itself in the upper portion, in a known manner.

This roll will be described in more detail hereafter.

This roll is then adapted to drive the pipe in a second stage of post-curing and complete crosslinking of the resin, said second stage being designated by general reference 5 and including heating means 6 making it possible to obtain the desired curing of the resin.

The pipe then enters a third stage of fastening of functional members, such as appendages and helical guiding means for example making it possible to fasten the pipe thus formed on the outer wall, a helical rib forming a screw pitch whereof the function will be described in more detail hereafter.

This third fastening stage is designated by general reference 7 in this figure, while the helical rib is designated by general reference 8.

The pipe then enters a fourth stage of safety anchoring and material inspection, designated by general reference 9, in which a certain number of inspections relative to the integrity of the pipe are done.

After this fourth anchoring and inspection step, the pipe enters a fifth stage of supporting, guiding and driving the lowering thereof, that stage being designated by general reference 10 in that figure and then including guide means, designated by general reference 11, through which the pipe, and in particular the helical guide rib thereof, passes to control the lowering of the pipe.

From the platform 1, the pipe descends into the water, as designated by general reference 12 in that figure, means for concealing it from solar radiation for example being provided between the lower portion of the platform 1 and the water to avoid any deterioration of the pipe. These concealing means are for example designated by general reference 13 and for example assume the form of a protective canvas sheet.

Other embodiments can of course be considered.

Means in the form of a grate or strainer can also be provided at the lower end of the pipe, those means being designated by general reference 14 in this figure.

One can then see that using such a facility, it is possible to produce a pipe with a large diameter in situ, continuously and vertically.

The basic idea is to use the "DROSTHOLM" continuous piping production technique, which consists of a cylindrical surface for receiving filamentary winding fiber webs. This surface then moves forward axially in a spiral and drives the wound fiber webs, which form the wall of the rigid pipe. This surface then rises through the inside of the roll to renew itself in the upper portion thereof.

This technique is described in the aforementioned FR or U.S. patent document. However, while in that document the cylindrical surface is made up of a continuous endless support hoop strip, in the plant according to the invention, the cylindrical surface is made up of the modular support elements in the form of plates, for example square, connected to one another so as to form the strip making up the cylindrical support surface.

Figure 2:
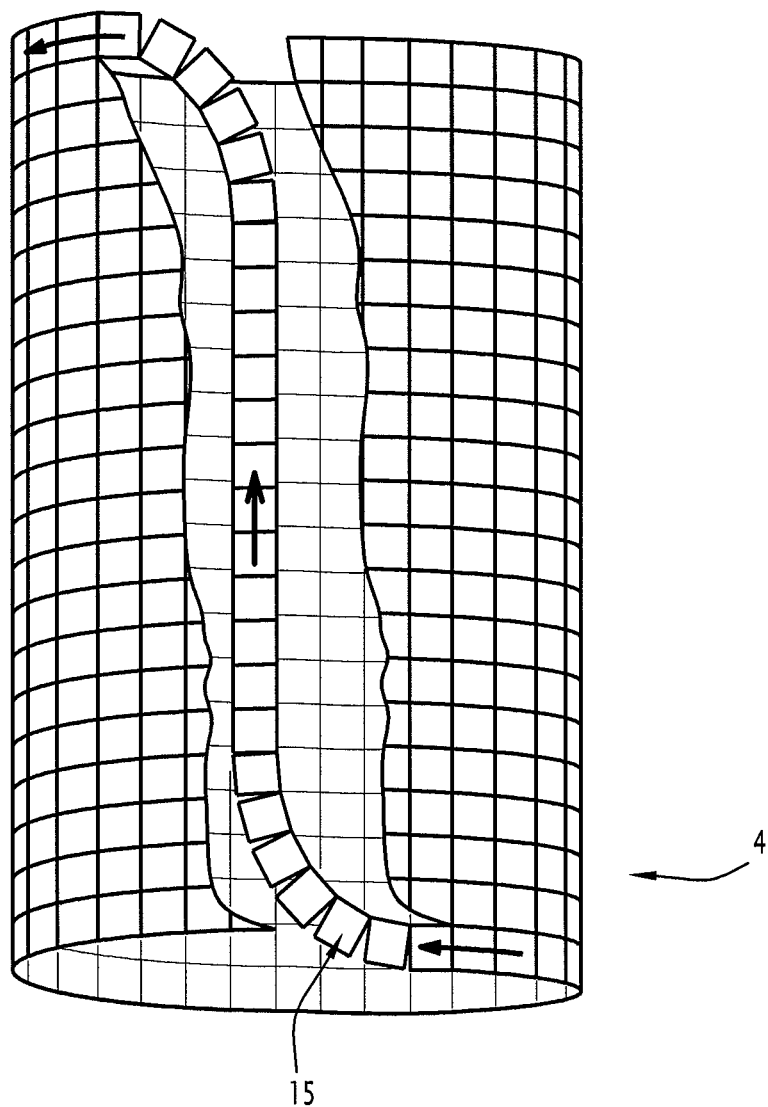
FIG. 2 shows a diagram illustrating the structure and operation of a roll comprised by a plant according to the invention.

This is illustrated in FIG. 2, which shows the roll designated by general reference 4 and the modular plate-shaped support elements, one of which is designated by general reference 15.

These modular elements are then connected to one another in any suitable manner to form a strip of modular elements alongside one another and to thereby form the surface for depositing the webs.

In a known manner, this strip repeats in the upper portion of the roll.

The first fiber web is then wound on the surface thus formed and is driven downward by the hoop of the roll.

If for example the web is one meter wide and the roll consists of a spiral that descends by one meter per revolution, the web then also descends by one meter per revolution. After one revolution, it returns to the initial winding without being superimposed. During that revolution it also descends 10 centimeters for every tenth of a revolution. If there are ten winding stations on a revolution, the web descending by 10 centimeters every tenth of a revolution is then covered with another strip of fibers, and its upper portion has received ten plies of fibers over the complete revolution. It is thus connected to the other layers without notable discontinuities.

One revolution then makes it possible to obtain a wall 5 mm thick with fabrics of 600 grams per square meter.

To create a wall 100 mm thick, it is then necessary to have 20 winding rows over a height of 20 meters. The machinery associated with the roll then consists of 200 winding carriages that must guide and impregnate the fiber webs.

During winding, the first crosslinking is done during deposition of each web so as to avoid a subsequent excessive exothermia due to the large wall thicknesses in the vicinity of 100 mm ultimately considered. By heating to a temperature of 45° to 50° C. for example, that temperature being below the vitreous transition temperature of about 100° C., the crosslinking will for example reach a maximum of 30%. This will thus dissipate 30% of the total exothermia without excessively stiffening the macromolecule matrix, such that the web comports well to the curvature of the surface and adheres thereto. Furthermore, this state of immediate pre-polymerization provides access to compacting of the surface by pressing rollers, bubble rollers, etc.

Once the thickness of 100 mm is reached at the bottom of the twenty winding stages, this intermediate crosslinking state is about 60% complete and provides an initial maintenance stiffness of the wall that then makes it possible to do away with the support of the roll. It is gradually released and rises through the inside of that roll.

The roll being released, the post-curing state must lead to the complete crosslinking of the resin by heating from the outside and inside of the pipe. This complete crosslinking is necessary to avoid aging of the material by reacting humidity. At that point, only about 30% of the energy remains to be dissipated. The ratio between the energy generated by chemical reaction and to be dissipated by the thermal pipe is the "DAMKOHLER" number. It must remain below 1 to avoid a temperature burst, and destruction of the wall of the pipe of the tube that may go as far as the explosion of the pile.

The end-of-crosslinking driving is therefore inseparable from the temperature to ensure the production of such a wall thickness. The speed of rotation is one regulating parameter.

Supporting appendages or devices are attached in the continuation of the previous curing.

By arranging a helical winding path adhered on the crosslinked wall, a complementary roller rolling path will make it possible to support the pipe and contribute to the rotation thereof. The variation in the pitch of that spiral may incorporate the mass of the tube, which increases during manufacturing. This path may reversibly rise partially in the tube if the stratification is not correct or if the wall needs to be corrected.

The manufacturing inspection is done on the resin and fiber components up to the final structure.

Thus, and as regards the resin, the acid number can be monitored, since an excessively high value leads to incomplete crosslinking, the provided resin then being poorly formed. It is also possible to carry out:

a weekly inspection of the styrene content, as its evaporation may lead to a lower crosslinking possibility, an inspection of the gelatinization duration to validate the inspection of the reactivity of the resin, and a viscosity inspection, which is necessary to proper wetting of the fibers of the fabrics.

The inspection of the fibers pertains to an inspection of the weight and mechanical integrity of the fabrics. The rolls of fiber provided include a binding method to quickly bind two fabrics by overlapping.

The polymerized material can also be inspected, since for all materials and components involved in the manufacture of the pipe, it should be verified that the minimum values of the defined properties are respected by performing tests. Thus for example, possible non-destructive inspection methods for these assemblies may be:

a visual examination making it possible to verify good bubblizing, good impregnation, good covering of the webs, ambient conditions, etc.

examination by measuring the "BARCOL" hardness, which makes it possible to determine the crosslinking level obtained by comparison. The "BARCOL" hardness measurement being local and the materials being heterogeneous, a great dispersion of the results may be observed. The crosslinking is correct when the material has a satisfactory hardness, for example greater than 40. Only the surface is accessible. Wall samplings should be provided for at the end of crosslinking.

an examination by DSC measurement that relates to the differential calorimetry, which makes it possible to measure the energy remaining to be dissipated after curing on a material sample and to detect sub-polymerization. DSC measurement is a destructive inspection that may be done either on a sample taken from the pipe or on a chip or control sample, a radiography examination, which may be used to check the accessory assemblies done by adhesion and detect areas lacking adhesive, an ultrasound examination, which makes it possible to detect unglued surfaces, delamination, empty spaces, and thickness variations, and to monitor fiber levels by burning.

During manufacturing, the environment must be clean and protected from weather. The temperature must not be below 15° C. or above 40° C. As stated above, a temperature of about 40° C. allows pre-crosslinking of the resin by dissipating part of the energy and a limitation of exothermia in the case of large thicknesses, i.e. larger than 30 mm.

A high ambient temperature causes a faster reaction of the resin. It is possible to modulate the reaction time by adding retarding agents into the resin. The physicochemical reactivity characterization makes it possible to control that data. The storage time leads to a curing degree of about 10%.

The ambient hygrometry must also be less than 80%.

During the winding phase, there must not be any water condensation on the wall of the pipe.

Given the thickness of the pipe, the porosities expected from energy absorption also are not too bothersome, as in the case of thin parts, the latter not being subject in its entirety to planar or transverse shearing.

One can thus see that it is possible to manufacture, in situ, a rigid pipe for drawing up cold water that must make it possible to extract cold water at a depth of about 1000 meters.

By manufacturing the pipe in situ, a certain number of problems are eliminated, such as those related to manufacturing it on land and towing it to the exploitation site. This also makes it possible to reduce the cost of such a pipe.

What is claimed is:

1. An apparatus for manufacturing a rigid pipe for drawing up deep water for a marine thermal energy facility, comprising:
a floating platform, a continuous production device installed in a vertical axis of the pipe on the floating platform, and comprising a first device for winding webs of fibers impregnated with resin around a winding roll for a partial crosslinking thereof, formed by modular elements in a form of plates connected together so as to form a strip moving in a spiral and repeating in an upper portion of the roll so as to form a winding surface of the webs.

2. The apparatus for manufacturing a rigid pipe for drawing up water as recited in claim 1 wherein each modular element assumes the form of a plate.

3. The apparatus for manufacturing a rigid pipe for drawing up water as recited in claim 1 further comprising: a second device for complete crosslinking of the resin; a third device for mounting functional members on the pipe; a fourth device for inspecting the pipe thus manufactured; and a fifth device for guiding the pipe.

4. The apparatus for manufacturing a rigid pipe for drawing up water as recited in claim 3 wherein the fifth device for guiding the pipe is a lower device including a helical guide device for cooperating with an outer rib of the pipe to drive the pipe into the water.

5. The apparatus for manufacturing a rigid pipe for drawing up water as recited in claim 1 further comprising protection for protecting the manufactured pipe from solar radiation, the protection being located between the platform and the water.

6. The apparatus for manufacturing a rigid pipe for drawing up water as recited in claim 5 wherein the protection includes a canvas sheet.

7. The apparatus for manufacturing a rigid pipe for drawing up water as recited in claim 3 wherein the second device for complete crosslinking of the resin includes a heater for heating the pipe.

* * * * *